United States Patent
Rose et al.

(10) Patent No.: US 7,334,065 B1
(45) Date of Patent: Feb. 19, 2008

(54) MULTIPLE DATA BUS SYNCHRONIZATION

(75) Inventors: Kenneth M. Rose, Palo Alto, CA (US); Jatin Batra, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1172 days.

(21) Appl. No.: 10/158,818

(22) Filed: May 30, 2002

(51) Int. Cl.
  G06F 13/12 (2006.01)
  G06F 3/00 (2006.01)
  G06F 13/00 (2006.01)
  G06F 13/40 (2006.01)
  H04L 12/50 (2006.01)
  H04L 12/28 (2006.01)

(52) U.S. Cl. ............... 710/65; 710/29; 710/33; 710/52; 710/307; 370/372; 370/389; 370/393

(58) Field of Classification Search ............ 370/389, 370/392, 393; 710/26, 33, 52, 65
See application file for complete search history.

(56) References Cited

U.S. PATENT DOCUMENTS 5,475,754 A * 12/1995 Bridgewater et al. ....... 380/212
6,298,387 B1 * 10/2001 Prasad et al. ............... 709/236
6,463,059 B1 * 10/2002 Movshovich et al. ....... 370/389
6,611,537 B1 * 8/2003 Edens et al. ................ 370/503
6,621,817 B1 * 9/2003 Chauvel ..................... 370/389
7,058,027 B1 * 6/2006 Alessi et al. ............. 370/310.1
2001/0009548 A1 * 7/2001 Morris ....................... 370/392

* cited by examiner

Primary Examiner—Alan Chen
(74) Attorney, Agent, or Firm—Cambell Stephenson LLP

(57) ABSTRACT

Disclosed is a method and circuit for synchronizing dual data buses. In one embodiment, the method includes a receiving circuit receiving first and second streams of multi-bit data portions transmitted via first and second parallel data buses, respectively, coupled thereto. The receiving circuit compares first-stream multibit data portions with a first predefined multibit data portion to identify a first-stream multibit data portion that matches the first predefined multibit data portion. The receiving circuit stores into a first FIFO, all first-stream multibit data portions that follow the identified first-stream multibit data portion. The receiving circuit also compares second-stream multibit data portions with a second predefined multibit data portion to identify a second-stream multibit data portion that matches the second predefined multibit data portion. The receiving circuit stores into a second FIFO, all second-stream multibit data portions that follow the identified second-stream multibit data portion.

18 Claims, 5 Drawing Sheets

MULTIPLE DATA BUS SYNCHRONIZATION

BACKGROUND OF THE INVENTION

Local switching networks (e.g., a switching network contained within an office building) may include a switching fabric that couples end-devices via line cards. The term "switching fabric" describes a distributed switching matrix that establishes a circuit through which data may be transmitted. A switching fabric may include a stored programmable control that seeks out a suitable combination of time slots and multiplexed highways for establishing a communication circuit between end devices. Multiple highways can simultaneously exist. The term "end device" may include desktop computers, printers, routers, other networking equipment, etc.

FIG. 1 illustrates relevant portions of an exemplary local switching network 100. In FIG. 1, local switching network 100 includes a switching fabric 102 (e.g., a cross-bar switching fabric) coupled to line cards 104 through 108. Each of the line cards may be coupled to one or more end devices or other networks. FIG. 1 shows line card 104 coupled to end devices 110 through 114, line card 106 coupled to end devices 116 through 120, and line card 108 coupled to end devices 122 through 126.

Local switching network 100 shown in FIG. 1 may employ one of many different communication protocols enabling data communication between one or more end devices 110 through 126 via line cards 104 through 108 and switching fabric 102. FIG. 1 will be described with reference to a communications protocol in which end devices communicate with each other by transferring data frames. Each data frame includes one or more lines of data.

Line cards 104 through 108 are coupled to switching fabric 102 via one or more serial data links. In FIG. 1 line card 104 is coupled to switching fabric 102 via serial downlink 128 and serial up-link 130; line card 106 is coupled to switching fabric 102 via serial downlink 132 and serial up-link 134; and line card 108 is coupled to switching fabric 102 via serial downlink 136 and serial up-link 138. Each of line cards 104 through 108 is coupled to its respective end devices via a common bus. Line card 104 is coupled to end devices 110 through 114 via common bus 140; line card 106 is coupled to end devices 116 through 120 via common bus 142; and line card 108 is coupled to end devices 122 through 126 via common bus 144.

FIG. 2a illustrates components of line card 104 of FIG. 1 relevant to the discussion of the present invention. More particularly, FIG. 2a shows line card 104 having circuit 150 coupled to circuit 152 via data buses 154a and 154b. Although not shown, each of the data buses 154a and 154b includes a plurality of conductive lines or traces formed on a printed circuit board for transmitting data bit signals between circuits 150 and 152. Circuit 150 is shown coupled to end devices 110 through 114 via common bus 140. Circuit 152 is shown coupled to serial up-link 130.

In operation, circuit 150 receives frames of data lines from end devices 110 to 114 via common bus 140. Although not shown, line card 104 includes circuitry which analyzes the received data lines to determine whether they are to be routed locally to one of the end devices 110 through 114, or via switching fabric 102 to one of the end devices coupled to line cards 106 or 108. If line card 104 determines that the received frames are to be routed locally, the received frames are transmitted back to one of the end devices 110 through 114 via common bus 140. If line card 104 determines that the received frames are to be routed to one of the end devices coupled to line cards 106 or 108, then circuit 150 transmits the received frames via data buses 154a and 154b. Circuit 152 reformats the frames received from circuit 150 for subsequent transmission to fabric 102 via serial up-link 130. Circuit 152 may also add routing information to each frame or data line thereof prior to their transmission to switching fabric 102.

FIG. 2b illustrates components of circuits 150 and 152 shown in FIG. 2a that are relevant to discussion of the present invention. Circuit 150 includes a data line FIFO 160 coupled to a plurality of input/output (IO) devices 162 and a plurality of IO devices 164. For ease of illustration, FIG. 2b shows only one of the IO devices 162 and one of the IO devices 164. Circuit 152 includes a data line FIFO 170 connected to the plurality of IO devices 172 and the plurality of IO devices 174. For ease of illustration, FIG. 2b shows only one of the IO devices 172 and one of the IO devices 174.

Operational aspects of transmitting data between circuits 150 and 152 will be described with respect to FIG. 2b. In general, FIFO 160 sequentially receives data lines from one of the end devices 110 through 114. FIFO 160 temporarily stores the received data lines until they are ready to be transmitted to circuit 152. When ready, FIFO 160 outputs a data line with each transition edge (i.e., rising or falling edge) of a clock provided thereto. Equally sized upper and lower portions of each data line are simultaneously provided to IO devices 162 and IO devices 164, respectively. IO devices 162 and IO devices 164 transmit the upper and lower portions, respectively, to data buses 154a and 154b, respectively, with each transition edge of the clock signal provided thereto. Data buses 154a and 154b, in turn, transmit in parallel the upper and lower portions to IO devices 172 and IO devices 174, respectively, of circuit 152. With each transition edge of the clock or clocks provided to IO devices 172 and IO devices 174, the upper and lower portions transmitted by data buses 154a and 154b, respectively, are reassembled and stored in FIFO 170.

The operation of circuits 150 and 152 described above presumes no relative delay in the transmission of corresponding upper and lower portions of data lines between FIFOs 160 and 170. In practice, the transmission of data line portions between FIFO 160 and FIFO 170 is subject to one or more relative delays. For example, variations in temperature of components of IO devices 162 and 164, variations in power supply voltage provided to IO devices 162 and 164, or physical variations of the transistors that form IO devices 162 and 164, may result in IO devices 162 transmitting the upper portion of a data line before or after transmission of the corresponding lower portion of the data line by IO devices 164. The traces of data bus 154a on average may be longer or shorter than the average length of traces of data bus 154b such that the data bus transmission time for the upper portion of data lines may be greater or smaller than the data bus transmission time of the corresponding lower portion. The clock signal provided to IO devices 162 may be delayed with respect to the clock signal provided to IO devices 164. IO devices 172 and 174, like their counterparts 10 devices 162 and 164, are subject to variations in operating temperature and variations in the power supply provided thereto. The transistors that form IO devices 172 and 174 may differ physically. Additionally, the clock signal provided to IO devices 172 may be delayed with respect to the clock signal provided to IO devices 174. As a result of one or more of the above delay factors, IO devices 172 may gate the upper portion of a data line received via data bus 154a before or after IO devices 174 gate the corresponding lower portion received via data bus 154b.

FIG. 2c illustrates the potential effects of relative delays in transmission of corresponding upper and lower data line portions between FIFO 160 and FIFO 170. FIG. 2c shows contents of FIFO 160 at time t=$t_0$. More particularly, FIFO 160 stores n data lines destined to be transmitted via data buses 154a and 154b to FIFO 170. In FIFO 160, Ax and Bx represent the upper and lower portions of each data line Dx, respectively. For example, data lines A1 and B1 represent the upper and lower portions of data line D1, respectively. FIG. 2c also illustrates FIFO 170 after data lines D1 through Dn have been transmitted as described above. For purposes of explanation, it will be presumed that transmission of the upper portion of each data line between FIFO 160 and FIFO 170 is delayed with respect to the corresponding lower portion. Because of the relative delay, corresponding upper and lower data line portions are not reassembled by circuit 152 into valid data lines prior to storage in FIFO 170. FIG. 2c shows the contents of FIFO 170 after transmission of the data lines D1 through Dn. As can be seen in FIG. 2c, the data lines stored in FIFO 170 are invalid since they consist of noncorresponding upper and lower portions.

SUMMARY OF THE INVENTION

Disclosed is a method and circuit for synchronizing dual data buses. It is noted that the method and circuit may used to synchronize more than two data buses. In one embodiment, the method includes a receiving circuit receiving first and second streams of multibit data portions transmitted via first and second parallel data buses, respectively, coupled thereto. The receiving circuit compares first-stream multibit data portions with a first predefined multibit data portion to identify a first-stream multibit data portion that matches the first predefined multibit data portion. The receiving circuit stores into a first FIFO, all first-stream multibit data portions that follow the identified first-stream multibit data portion. The receiving circuit also compares second-stream multibit data portions with a second predefined multibit data portion to identify a second-stream multibit data portion that matches the second predefined multibit data portion. The receiving circuit stores into a second FIFO, all second-stream multibit data portions that follow the identified second-stream multibit data portion. One multibit portions are stored in the first and second FIFOs, the first and second FIFOs sequentially output multibit data portions for subsequent concatenation.

BRIEF DESCRIPTION OF THE FIGURES

The present invention may be better understood, and its numerous objects, features and advantages made apparent to those skilled in the art by referencing the accompanying figures. The use of the same reference number throughout the figures designates a like or similar element.

FIG. 2b illustrates relevant components of circuits contained within the line card of FIG. 2a;

FIG. 2c illustrates operational aspects of the circuits shown in FIG. 2b;

While the invention is susceptible to various modifications and alternative forms, specific embodiments thereof are shown by way of example in the figures and will herein be described in detail. However, the figures and detailed description thereto are not intended to limit the invention to the particular form disclosed. On the contrary, the intention is to cover all modifications, equivalents, and alternatives falling within the spirit and scope of the present invention as defined by the appended claims.

DETAILED DESCRIPTION

Figure 1:
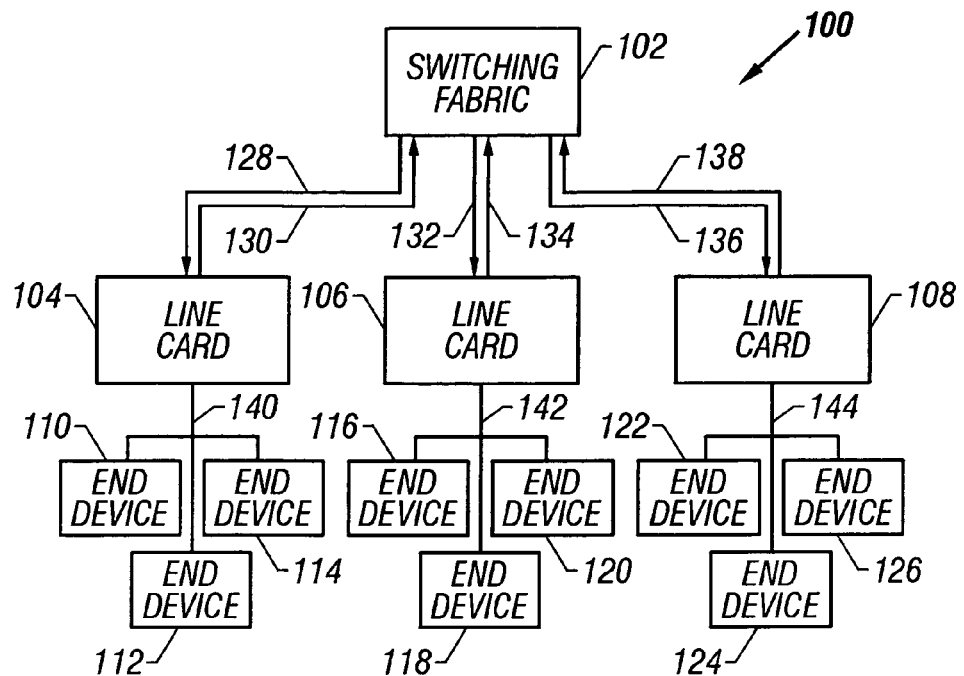
FIG. 1 illustrates and exemplary local switching network.
Figure 2A:
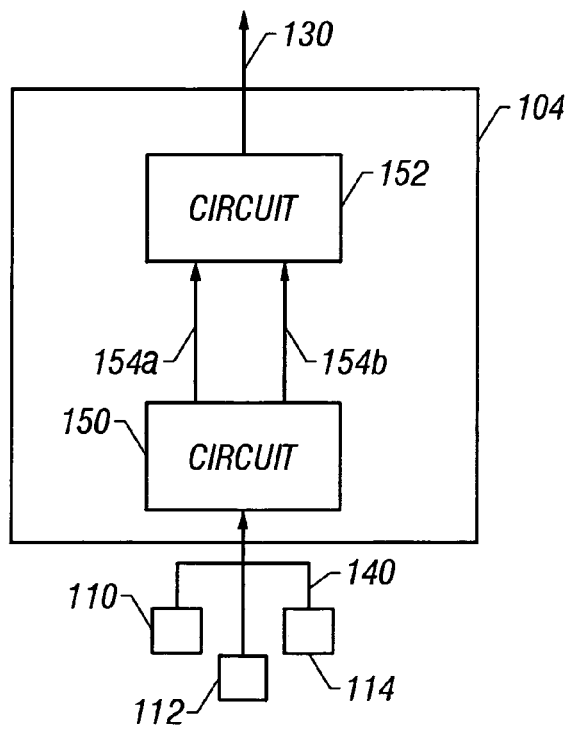
FIG. 2a illustrates relevant components of a line card contained in FIG. 1.
Figures 2B, 2C:
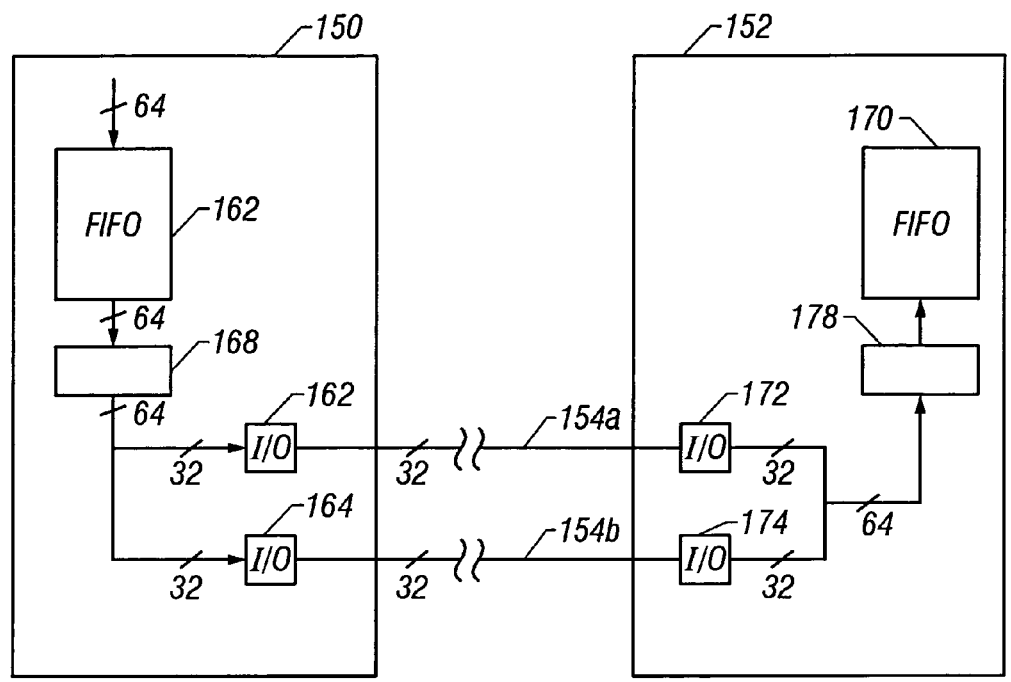
Figure 3:
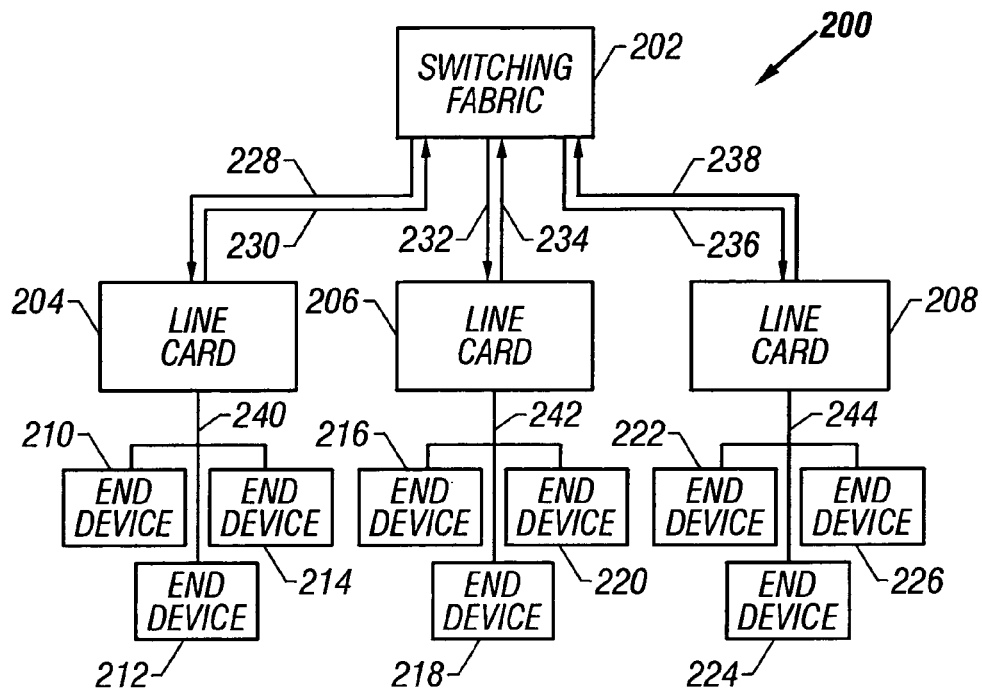
FIG. 3 illustrates relevant portions of a local switching network employing one embodiment of the present invention.

FIG. 3 illustrates relevant portions of a local switching network 200 employing the present invention. The present invention should not be limited to use within a switching network. Rather, the present invention will find application in systems where data is transmitted between separate circuits via two or more data buses.

Local switching network 200 includes a switching fabric (e.g., a cross-bar switching fabric) coupled to line cards 204 through 208. Line card 204 is coupled to end devices 210 through 214; line card 206 is coupled to end devices 216 through 220; and line card 208 is coupled to end devices 222 through 226. Devices or circuits can be coupled together either directly, i.e., without any intervening device or circuit, or indirectly, with one or more intervening devices or circuits. As used herein, the terms "connected devices" or "connected circuits" means two or more devices or circuits directly connected together with no intervening device or circuit. The term "coupled" includes the term "connected" within its definition.

The local switching network 200 shown in FIG. 3 may employ one of many different communication protocols enabling data communication between one or more end devices 210 through 226 via line cards 204 through 208 and switching fabric 202. The switching network 200 shown in FIG. 3 will be described as employing a communications protocol in which end devices communicate with each other by transferring data frames via the line cards and the switching fabric. End devices (e.g., end devices 210 and 214) can locally communicate with each other without having to transmit frames via the line cards and switching fabric.

Line cards 204 through 208 are coupled to switching fabric via one or more serial data links. In FIG. 3, line card 204 is coupled to switching fabric 202 via serial downlink 228 and serial up-link 230; line card 206 is coupled to switching fabric 202 via serial downlink 232 and serial up-link 234; and line card 208 is coupled to switching fabric 202 via serial downlink 236 and serial up-link 238. Line cards 204 through 208 communicate with their respective end devices via a common bus. Line card 204 communicates with end devices 210 through 214 via common bus 240; line card 206 communicates with end devices 216 through 220 via common bus 242; and line card 208 communicates with end devices 222 through 226 via common bus 244.

Figure 4:
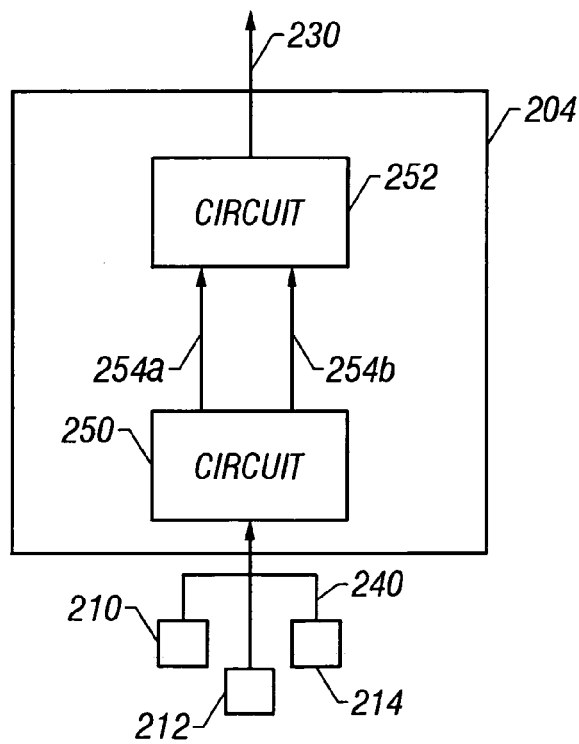
FIG. 4 illustrates relevant portions of a line card employed within the network of FIG. 3.

FIG. 4 illustrates portions of line card 204 relevant to one embodiment of the present invention. In FIG. 4, line card 204 includes a circuit 250 coupled to a circuit 252 via a pair of source-synchronous data buses 254a and 254b. It should also be understood that the present invention should not be limited to circuits coupled via source-synchronous data buses. Rather, data buses other than source-synchronous data buses may be employed between circuits 250 and 252. Data buses 254a and 254b transmit data line portions from circuit 250 to circuit 252 as will be more fully described below. A separate pair of data buses (not shown) is provided for transmitting data line portions from circuit 252 to circuit 250. The present invention will be described with respect to the transmission of data line portions from circuit 250 to circuit 252, it being understood that the present invention may find application with respect to transmission of data line portions from circuit 252 to circuit 250.

Each of the data buses 254a and 254b includes a plurality of conductive lines or traces for transmitting data portions. A data portion consists of a plurality of data bits. Additionally, each of the data buses 254a and 254b includes a trace for conducting a strobe or clock. Data buses 254a and 254b are capable of simultaneously transmitting data portions and clocks. The traces of data buses 254a and 254b may be formed on a printed circuit board (not shown).

In operation, circuit 250 receives data lines from end devices 210 through 214 via common bus 240. Although not shown, line card 204 includes circuitry which analyzes the received data lines to determine whether they are to be routed locally to one of the end devices 210 through 214, or via switching fabric 202 to one of the end devices coupled to line cards 206 or 208. If circuitry of line card 204 determines that the received data lines are to be routed locally, the received data lines are transmitted back to one of the end devices 210 through 214 via common bus 240. If circuitry of line card 204 determines that the received data lines are to be routed to one of the end devices coupled to line cards 206 or 208, then, as will be more fully described below, circuit 250 transmits the received data lines to circuit 252 via data buses 254a and 254b. Data lines are transmitted to circuit 252 in data portions of equal size. More particularly, corresponding upper and lower portions of each data line are transmitted to circuit 252 via data buses 254a and 254b, respectively. Circuit 252 then reassembles corresponding upper and lower data portions back into data lines for subsequent processing.

Transmission of upper data line portions between circuits 250 and 252 is presumed delayed with respect to the transmission of corresponding lower data line portions. Without the present invention, upper and lower portions of data lines transmitted to circuit 252 may be improperly reassembled. Circuits 250 and 252 operate to insure that the received upper and lower data line portions are properly reassembled into valid data lines notwithstanding relative delay in their transmission. Circuits 250 and 252 operate in this manner after a data transmission synchronizing function (more fully described below), is performed.

Figure 5:
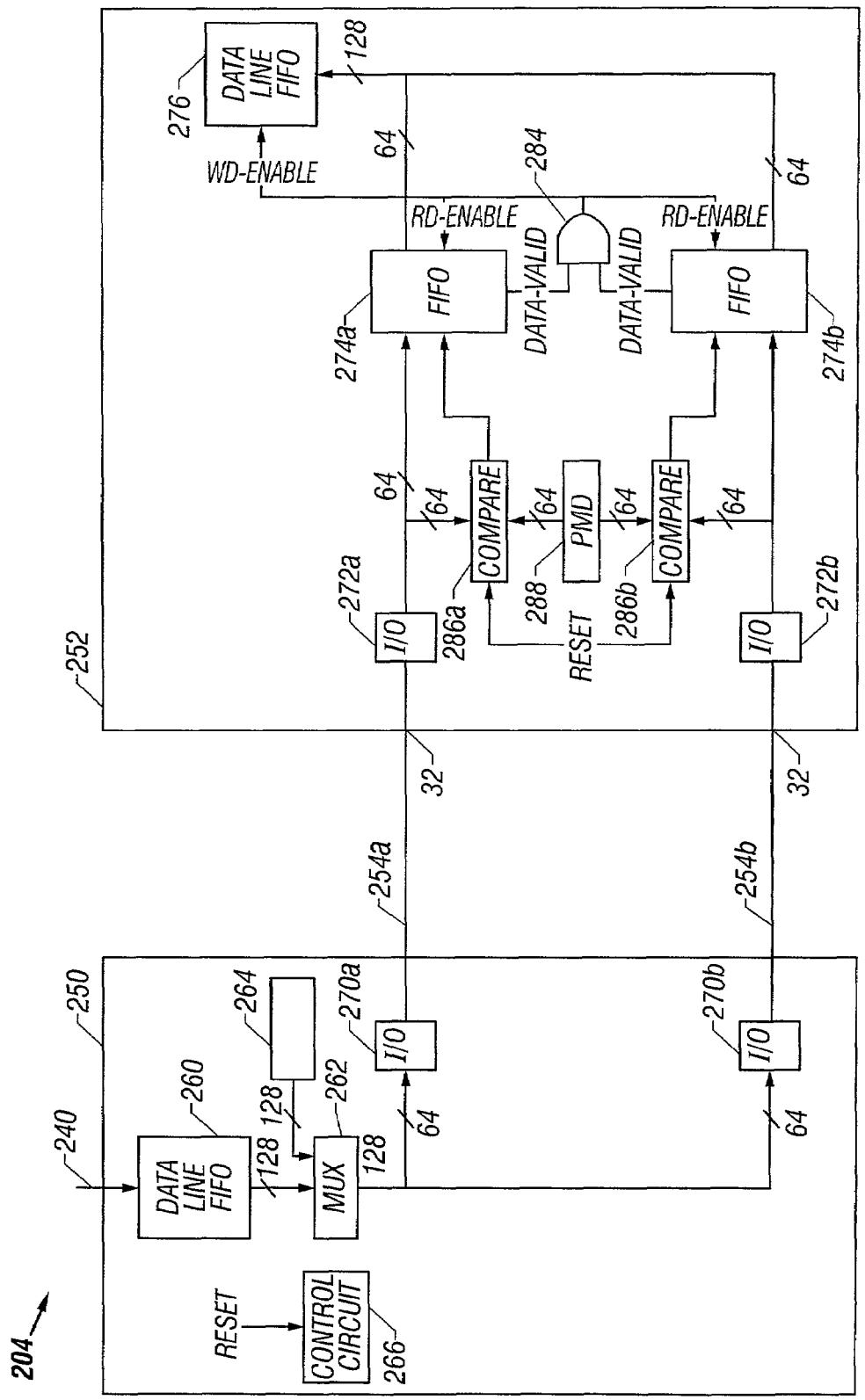
FIG. 5 illustrates relevant portions of the circuits contained within the line card of FIG. 4.

FIG. 5 illustrates relevant portions of one embodiment of circuits 250 and 252 shown in FIG. 4. More particularly, circuit 250 shown in FIG. 5 includes a data line FIFO 260 configured to receive data lines from one of the end devices 210 through 214. FIFO 260 stores the received data lines until they are ready to be transmitted to circuit 252. Circuit 250 also includes a multiplexer 262. Multiplexer 262 couples its output to programmable memory 264 or to FIFO 260 depending on the state of a control signal generated by a control circuit 266, as will be more fully described below. Lastly, circuit 250 includes a plurality of IO devices 270a and a plurality of IO devices 270b. For ease of illustration, FIG. 5 shows only one of the IO devices 270a and one of the IO devices 270b. Each of the IO devices 270a is coupled to a respective trace of data bus 254a, while each of the IO devices 270b is coupled to a respective trace of data bus 254b. IO devices 270a and IO devices 270b transmit data portions to circuit 250 via buses 254a and 24b, respectively.

Circuit 252 includes a plurality of IO devices 272a and a plurality of IO devices 272b. For purposes of illustration, FIG. 5 shows only one IO device 272a and one IO device 272b. Each IO device 272a is coupled to a respective trace of data bus 254a, while each IO device 272b is coupled to a respective trace of data bus 254b. IO devices 272a and IO devices 272b receive data portions via data buses 254a and 254b, respectively. Circuit 252 of FIG. 5 further includes FIFOs 274a and 274b, the data inputs of which are coupled to IO devices 272a and IO devices 272b, respectively. FIFOs 274a and 274b take form in synchronizing FIFOs, it being understood that the present invention should not be limited thereto. Although not shown, respective clock signals of source-synchronous data buses 254a and 245b are provided as write clocks for synchronizing FIFOs 274a and 274b, respectively. The read clock provided to synchronizing FIFOs 274a and 273b may be derived from one of the clock signals provided by source-synchronous data bus 254a or 254b.

Circuit 252 also includes a FIFO 276, the input of which is coupled to the data outputs of FIFOs 274a and 274b. Lastly, circuit 252 includes a NAND gate 284, compare circuits 286a and 286b, and programmable memory device 288. NAND gate 284 has inputs coupled to outputs of compare circuits 286a and 286b, and an output coupled to read-enable inputs of FIFOs 274a and 274b. The outputs of compare circuits 286a and 286b are also coupled to respective write-enable inputs of FIFOs 274a and 274b. Inputs of compare circuit 286a are coupled to a programmable memory device 288 and to the plurality of IO devices 272a, while inputs of compare circuit 286b are coupled to a programmable memory device 288 and to the plurality of IO devices 272b. Thus, data portions received by IO devices 272a are subsequently provided to both compare circuit 286a and FIFO 274a, and data portions received by IO devices 272b are subsequently provided to compare circuit 286b and FIFO 274b.

Circuits 250 and 252 perform the synchronizing function mentioned above in response to receiving a RESET instruction at the same point in time from a device external to circuits 250 and 252. The RESET instruction is provided to control circuit 266 and to compare circuits 286a and 286b. In response to the RESET instruction, control circuit 266 generates a control signal that instructs multiplexer 262 to couple the output of programmable memory 264 to IO devices 270a and IO devices 270b. Programmable memory 264 includes a predefined code. The predefined code is concatenated with itself before being provided to multiplexer 262. Thus, IO devices 270a and IO devices 270b each receive the predefined code stored in memory 264 in response to control circuit 266 receiving the RESET instruction. IO devices 270a and IO devices 270b each transmit the predefined code to data buses 254a and 254b, respectively, upon a transition edge of a clock provided thereto. Before the next transition edge of the clock provided to IO devices 270a and IO devices 270b, control circuit 266 generates a signal instructing multiplexer 262 to couple the output of FIFO 260 to IO devices 270a and IO devices 270b. Thereafter, multiplexer 262 transmits data lines outputted from FIFO 260 in a line-by-line manner. The upper and lower portions of each data line are provided to IO devices 270a and IO devices 270b, respectively. IO devices 270a and IO devices 270b, respectively, transmit upper and lower portions of data lines to data buses 254a and 254b, respectively, with each transition edge of the clock provided thereto.

Normally, compare circuits 286a and 286b assert respective write-enable signals that enable FIFOs 274a and 274b, respectively, to receive and store data portions transmitted by data buses 254a and 245b, respectively, and IO devices 272a and IO devices 272b, respectively. NAND gate 284 asserts a read-enable signal in response to receiving the write-enable signals from compare circuits 286a and 286b. The read-enable signal enables FIFOs 274a and 274b to output multibit data portions for concatenation and subsequent storage in FIFO 276. If either of the compare circuits 286a and 286b assert a write disable signal, then NAND gate 284 asserts a read disable signal that disables FIFOs 274a and 274b from outputting data portions.

As noted, compare circuits 286a and 286b receive the RESET instruction at the same time control circuit 266 receives the RESET instruction. In response, compare circuits 286a and 286b assert respective write disable signals. The write disable signals disable FIFOs 274a and 274b from storing multibit data portions received from data buses 254a and 254b, respectively, and IO devices 270a and IO devices 270b, respectively. Because compare circuits 286a and 286b assert write disable signals, NAND gate 284 generates a read disable signal which disables read access to FIFOs 274a and 274b. Thus, in response to receiving the RESET instruction, compare circuits 286a and 286b directly or indirectly disable read and write access to FIFOs 274a and 282b.

Compare circuit 286a continues to assert its write disable signal until it detects a match between a data portion received from data bus 254a via IO devices 272a and a predefined code stored in programmable memory 288. Likewise, compare circuit 286b continues to assert its write disable signal until it detects a match between a data portion received from data bus 254b via IO devices 272b and the predefined multibit code stored in programmable memory 288. The predefined code stored in programmable memory 288 equals the predefined code stored in programmable memory 264.

When compare circuit 286a detects a match between the predefined code in memory 288 and a data portion received from data bus 254a via IO devices 272a, compare circuit 286a continuously asserts a write-enable signal that enables FIFO 274a to receive and store the data portions received from data bus 254a that follow the data portion that matches the predefined code in memory 288. In an alternative embodiment, FIFO 274a may receive and store the data portion that matches the predefined code in memory 288 in addition to the data portions that follow. Similarly, when compare circuit 286b detects a match between the predefined code in memory 288 and a data portion received from data bus 254b via IO devices 272b, compare circuit 286b continuously asserts a write-enable signal that enables FIFO 274b to receive and store the data portions received from data bus 254b that follow the data portion that matches the predefined code in memory 288. In another alternative embodiment, FIFO 274b may receive and store the data portion that matches the predefined code in memory 288 in addition to the data portions that follow. When both the write-enable signals are asserted by compare circuits 286a, NAND gate 284 generates a read-enable signal. FIFOs 274a and 274b, in response to receiving the read-enable signal, begin outputting multibit data portions in parallel with each edge transition of the read clock provided thereto. The multibit data portions outputted by FIFOs 274a and 274b are concatenated and subsequently stored in FIFO 276.

Figure 6:
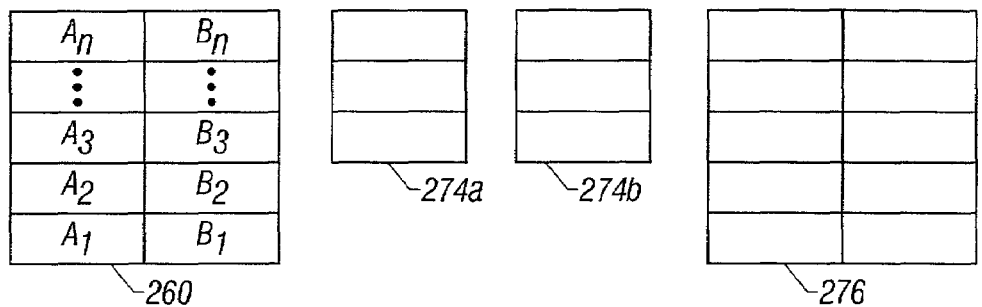
FIGS. 6 though 9 illustrate operational aspects of the circuits shown in FIG. 5.

FIG. 6 through FIG. 9 illustrate the effects of synchronizing data transmission between circuits 250 and 252 via data buses 254a and 254b. The synchronization process begins when control circuit 266 and compare circuits 286a and 286b receive the RESET instruction. FIG. 6 shows the contents of FIFOs 266, 274a, 274b, and 276 when RESET instruction is received.

Compare circuits 286a and 286b along with NAND gate 284 assert signals that disable write and read access to FIFOs 274a and 274b in response to compare circuits 286a and 286b receiving the RESET instruction. IO devices 270a and 270b transmit the predefined code stored in memory 264 in response to control circuit 266 receiving the RESET instruction. For purposes of explanation, it will be presumed that the predefined code transmitted via data bus 254a arrives at inputs to compare circuit 286a and FIFO 274a before the predefined code transmitted via data bus 254b arrives at inputs to compare circuit 286b and FIFO 274b. This presumption extends to corresponding upper and lower portions of data lines transmitted via data buses 254a and 254b.

Figure 7:
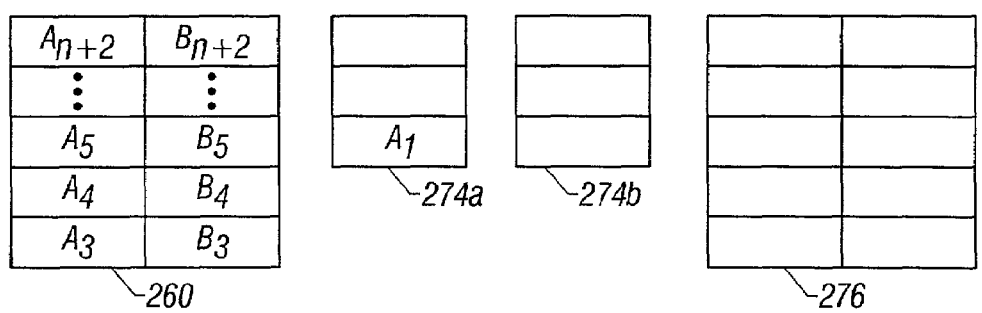

At some time after the compare circuits 286a and 286b receive the RESET instruction, compare circuit 286a detects a match between the predefined code in memory 288 and the predefined code transmitted by IO devices 270a via data bus 254a. In response, compare circuit 286a continuously asserts a write-enable signal. FIFO 274a, in response to receiving the write-enable signal from compare circuit 286a, stores all data portions provided thereto that follow the predefined code. FIG. 7 shows the contents of FIFOs 266, 274a, 274b and 276 just after the first data portion is stored in FIFO 274a. Due to the relative delay in transmission of corresponding upper and lower portions of data lines, FIFO 274a will begin to store upper portions of data lines before FIFO 274b stores lower portions of data lines.

Figure 8:
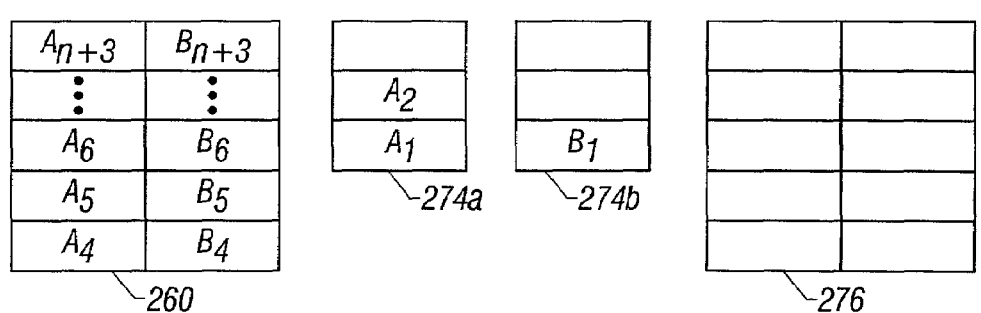

Eventually, compare circuit 286b detects a match between the predefined code in memory 288 and the predefined code transmitted by IO devices 270b via data bus 254b. In response, compare circuit 286b continuously asserts a write-enable signal. FIFO 274a, in response to receiving the write-enable signal from compare circuit 286b, stores all data portions provided thereto that follow the predefined code. FIG. 8 shows the contents of FIFOs 266, 274a, 274b and 276 just after the first data portion is stored in FIFO 274a. It can be seen that FIFO 274a stores two data portions, while FIFO 274b stores only one data portion. As can be expected, the first portions read from FIFOs 274a and 274b will be corresponding upper and lower portions of a data line.

Figure 9:
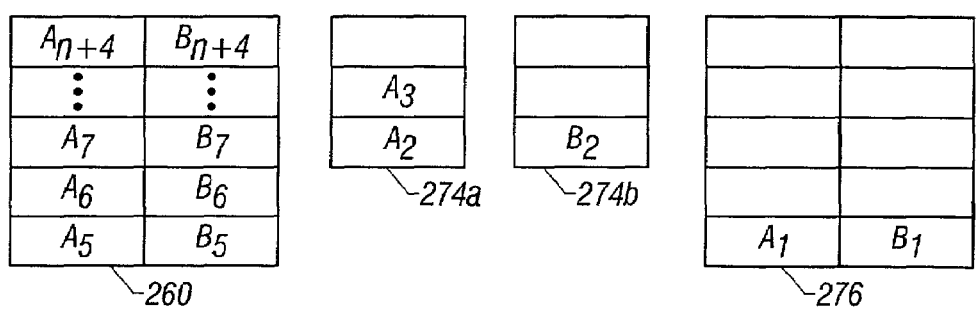

The compare circuits 286a and 286b continuously assert the write-enable signals, as noted above. With both write-enable signals asserted by compare circuits 286a and 286b, NAND gate 284 asserts a read-enable signal. In response, FIFOs 274a and 274b output respective data portions on each transition edge of a read clock provided thereto for concatenation and subsequent storage in FIFO 276. FIG. 9 shows the contents of FIFOs 266, 274a, 274b and 276 after the read-enable signal is asserted. As can be seen in FIG. 9, the first data line stored in FIFO 276 represents a concatenation of the first data lines.

Although the present invention has been described in connection with several embodiments, the invention is not intended to be limited to the specific forms set forth herein. On the contrary, it is intended to cover such alternatives, modifications, and equivalents as can be reasonably included within the spirit and scope of the invention as defined by the appended claims.

What is claimed is:

1. A method comprising:
   a receiving circuit receiving first and second streams of multibit data portions transmitted via first and second n-bit parallel data buses, respectively, coupled thereto;
   the receiving circuit comparing first-stream multibit data portions with a first predefined multibit data portion to identify a first-stream multibit data portion that matches the first predefined multibit data portion;
   the receiving circuit storing into a first FIFO buffer, all first-stream multibit data portions that follow the identified first-stream multibit data portion;
   the receiving circuit comparing second-stream multibit data portions with a second predefined multibit data portion to identify a second-stream multibit data portion that matches the second predefined multibit data portion;
   the receiving circuit storing into a second FIFO buffer, all second-stream multibit data portions that follow the identified second-stream multibit data portion;
   concatenating second-stream multibit data portions stored in the second FIFO buffer with respective first-stream multibit data portions stored in the first FIFO buffer to form multibit data lines;
   transmitting the multibit data lines via a 2n-bit parallel data bus.

2. The method of claim 1 wherein the first and second predefined multibit data portions are identical to each other.

3. The method of claim 1 further comprising:
   the receiving circuit generating a first signal in response to identifying the first-stream multibit data portion that matches the first predefined multibit data portion;
   the receiving circuit generating a second signal in response to identifying the second-stream multibit data portion that matches the second predefined multibit data portion;
   the first FIFO buffer sequentially outputting each of the first-stream multibit data portions stored therein in response to the receiving circuit generating the first and second signals.

4. The method of claim 1 further comprising:
   storing the multibit data lines in a data line FIFO buffer.

5. The method of claim 1 further comprising:
   a transmitting circuit simultaneously transmitting first and second predefined multibit portions on the n-bit first and second parallel data buses, respectively, coupled thereto;
   the transmitting circuit simultaneously transmitting first and second multibit data line portions on the n-bit first and second parallel data buses, respectively, after transmission of the first and second predefined multibit portions.

6. An apparatus comprising:
   a n-bit first data bus;
   a first memory circuit coupled to the first n-bit data bus, wherein the first memory circuit is configured to store first-stream multibit data portions transmitted over the first n-bit data bus;
   a first circuit coupled to the first n-bit data bus and the first memory circuit, wherein the first circuit is configured to compare a first predefined multibit data portion with first-stream multibit data portions transmitted over the first n-bit data bus in order to identify a first-stream multibit data portion that matches the first predefined multibit data portion;
   wherein first memory circuit is configured to store first-stream multibit data portions in response to the first circuit identifying the first-stream multibit data portion that matches the first predefined multibit data portion;
   a second n-bit data bus;
   a second memory circuit coupled to the second n-bit data bus, wherein the second memory circuit is configured to store second-stream multibit data portions transmitted over the second n-bit data bus;
   a second circuit coupled to the second n-bit data bus and the second memory circuit, wherein the second circuit is configured to compare a second predefined multibit data portion with second-stream multibit data portions transmitted over the second n-bit data bus in order to identify a second-stream multibit data portion that matches the second predefined multibit data portion;
   wherein second memory circuit is configured to store second-stream multibit data portions in response to the second circuit identifying the second-stream multibit data portion that matches the second predefined multibit data portion;
   a circuit coupled to the first and second memory circuits, wherein the circuit is configured to concatenate respective multibit data portions stored in the first and second memory circuits to form multibit data lines;
   a 2n-bit parallel data bus coupled to the circuit for transmitting the multibit data lines.

7. The apparatus of claim 6:
   wherein the first memory circuit is configured to store only first-stream multibit data portions that sequentially follow the identified first-stream multibit data portion over the first n-bit data bus in response to the first circuit identifying the first-stream multibit data portion that matches the first predefined multibit data portion;
   wherein the second memory circuit is configured to store only second-stream multibit data portions that sequentially follow the identified second-stream multibit data portion over the second n-bit data bus in response to the second circuit identifying the second-stream multibit data portion that matches the second predefined multibit data portion.

8. The apparatus of claim 7:
   wherein the first memory circuit is configured to store only the identified first-stream data portion and first-stream multibit data portions that sequentially follow the identified first-stream multibit data portion over the first n-bit data bus in response to the first circuit identifying the first-stream multibit data portion that matches the first predefined multibit data portion;
   wherein the second memory circuit is configured to store only the identified second-stream data portion and second-stream multibit data portions that sequentially follow the identified second-stream multibit data portion over the second n-bit data bus in response to the second circuit identifying the second-stream multibit data portion that matches the second predefined multibit data portion.

9. The apparatus of claim 6:
   wherein the first memory circuit comprises a first FIFO buffer configured to store first-stream multibit data portions in response to the first circuit identifying the first-stream multibit data portion that matches the first predefined multibit data portion;
   wherein the second memory circuit comprises a second FIFO buffer configured to store second-stream multibit data portions in response to the second circuit identifying the second-stream multibit data portion that matches the second predefined multibit data portion.

10. The apparatus of claim 6 wherein the first and second predefined multibit data portions are identical to each other.

11. The apparatus of claim 6 further comprising first and second transmitting circuits coupled to the first and second n-bit data buses, respectively, wherein the first and second transmitting circuits are configured to simultaneously transmit first and second predefined multibit data portions, respectively, on the first and second n-bit data buses, respectively, and wherein the first and second transmitting circuits are configured to simultaneously transmit first and second multibit data portions on the first and second n-bit data buses, respectively, after transmission of the first and second predefined multibit data portions.

12. A memory for storing instructions executable by a computer system, wherein computer system performs a method in response to executing the instructions, the method comprising:
    comparing first-stream multibit data portions transmitted via a first n-bit parallel data bus with a first predefined multibit data portion to identify a first-stream multibit data portion that matches the first predefined multibit data portion;
    storing into a first FIFO buffer, all first-stream multibit data portions that follow the identified first-stream multibit data portion;
    comparing second-stream multibit data portions transmitted via a second n-bit parallel data bus with a second predefined multibit data portion to identify a second-stream multibit data portion that matches the second predefined multibit data portion;
    storing into a second FIFO buffer, all second-stream multibit data portions that follow the identified second-stream multibit data portion;
    concatenating second-stream multibit data portions stored in the second FIFO buffer with respective first-stream multibit data portions stored in the first FIFO buffer to form multibit data lines;
    transmitting the multibit data lines onto a 2n-bit parallel data bus.

13. The memory of claim 12 wherein the method further comprises:
    generating a first signal in response to identifying the first-stream multibit data portion that matches the first predefined multibit data portion;
    generating a second signal in response to identifying the second-stream multibit data portion that matches the second predefined multibit data portion;
    the first and second FIFO buffers outputting each of the first-stream multibit data portions and second-stream multibit data portions respectively stored therein in response to the generating the first and second signals.

14. The memory of claim 12 wherein the method further comprises:
    storing the multibit data lines in a data line FIFO buffer.

15. The memory of claim 12 wherein the method further comprises:
    simultaneously transmitting first and second predefined multibit portions over the first and second n-bit parallel data buses, respectively;
    simultaneously transmitting first and second multibit data line portions on the first and second n-bit parallel data buses, respectively, after transmission of the first and second predefined multibit portions.

16. An apparatus comprising:
    a first n-bit data bus;
    a first memory circuit coupled to the first n-bit data bus, wherein the first memory circuit is configured to store first-stream multibit data portions transmitted sequentially over the first n-bit data bus;
    a first means coupled to the first n-bit data bus and the first memory circuit, wherein the first means is configured to compare a first predefined multibit data portion with first-stream multibit data portions transmitted sequentially over the first n-bit data bus in order to identify a first-stream multibit data portion that matches the first predefined multibit data portion;
    wherein first memory circuit is configured to store first-stream multibit data portions in response to the first means identifying the first-stream multibit data portion that matches the first predefined multibit data portion;
    a second n-bit data bus;
    a second memory circuit coupled to the second n-bit data bus, wherein the second memory circuit is configured to store second-stream multibit data portions transmitted sequentially over the second n-bit data bus;
    a second means coupled to the second n-bit data bus and the second memory circuit, wherein the second means is configured to compare a second predefined multibit data portion with second-stream multibit data portions transmitted sequentially over the second n-bit data bus in order to identify a second-stream multibit data portion that matches the second predefined multibit data portion;
    wherein second memory circuit is configured to store second-stream multibit data portions in response to the second means identifying the second-stream multibit data portion that matches the second predefined multibit data portion;
    means for concatenating second-stream multibit data portions stored in the second memory circuit with respective first-stream multibit data portions stored in the first memory circuit to form multibit data lines;
    a 2n-bit parallel data bus coupled for transmitting the multibit data lines.

17. A method comprising:
    receiving first and second streams of multibit data transmitted via first and second n-bit parallel data buses, respectively;
    comparing portions of the first-stream of multibit data with a first predefined multibit data portion to identify a portion of the first-stream of multibit that matches the first predefined multibit data portion;
    storing into a first FIFO buffer, all portions of the first-stream of multibit data that follow the identified portion of the first-stream of multibit data that matches the first predefined multibit data portion;
    comparing portions of the second-stream of multibit data with a second predefined multibit data portion to identify a portion of the second-stream of multibit data that matches the second predefined multibit data portion;
    storing into a second FIFO buffer, all portions of the second-stream of multibit data that follow the identified portion of the second-stream of multibit data that matches the second predefined multibit data portion;
    concatenating portions of the second-stream of multibit data stored in the second FIFO buffer with respective portions of the first-stream of multibit data stored in the first FIFO buffer to form multibit data lines;
    transmitting the multibit data lines onto a 2n-bit parallel data bus.

18. The method of claim 17 further comprising an act of transmitting the multibit data lines to a switching fabric.

* * * * *